United States Patent [19]
Blum

[11] 3,878,373
[45] Apr. 15, 1975

[54] RADIATION DETECTION DEVICE AND A RADIATION DETECTION METHOD

[76] Inventor: Alvin Blum, 2350 Del Mar Pl., Coral Gables, Fla. 33301

[22] Filed: June 30, 1971

[21] Appl. No.: 158,503

[52] U.S. Cl. ............. 235/151.3; 128/2 A; 250/252; 250/303; 250/393
[51] Int. Cl. ............................................ G01n 23/00
[58] Field of Search ........ 444/1; 128/1.1, 2.07, 2 A, 128/2.1 R; 250/71.5 R, 252, 303, 393; 235/151.3

[56] References Cited
UNITED STATES PATENTS

| | | |
|---|---|---|
| 3,327,116 | 6/1967 | Loveday .......................... 250/71.5 R |
| 3,509,339 | 4/1970 | Doehner ..................... 250/71.5 R X |
| 3,594,577 | 7/1971 | Loveday .......................... 250/71.5 R |
| 3,609,362 | 9/1971 | Laney ............................. 250/71.5 R |
| 3,622,784 | 11/1971 | Del Guercio ....................... 250/393 |

Primary Examiner—Charles E. Atkinson
Assistant Examiner—Stephen Dildine, Jr.

[57] ABSTRACT

A radiation detection device including at least one scintillator in the path of radiation emissions from a distributed radiation source; a plurality of photodetectors for viewing each scintillator; a signal processing means, a storage means, and a data processing means that are interconnected with one another and connected to said photodetectors; and display means connected to the data processing means to locate a plurality of radiation sources in said distributed radiation source and to provide an image of the distributed radiation sources. The storage means includes radiation emission response data and location data from a plurality of known locations for use by the data processing means to derive a more accurate image by comparison of radiation responses from known locations with radiation responses from unknown locations.

6 Claims, 8 Drawing Figures

RADIATION DETECTION DEVICE AND A RADIATION DETECTION METHOD

BACKGROUND OF THE INVENTION

This invention relates to a radiation detection device and method for locating each of a plurality of radiation sources and, more particularly, to an instrument for surveying the disposition of a distributed radiation source and deriving a more accurate image by comparison of radiation responses from known locations with radiation responses from unknown locations.

The prior art has dealt with the mapping of body components that are inaccessible to ordinary observation. The radiation instrument, disclosed in the Tobias, et al., patent, Ser. No. 2,779,876 provides phototubes disposed adjacent a scintillator for locating the image point in the scintillator after radioactive emission by determining which phototube provides a responsive signal. The Anger Pat., No. 3,011,057, improved the resolution of the Tobias, et al., patent in order to locate the apparent image point, in the scintillator, in an area smaller than a phototube by spacing the phototubes a moderate distance from the scintillator, so that several phototubes may report each light flash. The electrical signal from each phototube circuit, which reports the apparent location of each scintillation in relation to a coordinate system in the scintillator and not the location of the radiation source. In the Tobias, et al, and Anger patents, no provision is made for inhomogeneities within the scintillator, nonlinearity of the response of different regions of a phototube, nonuniformity of the phototubes, nonlinearity of the optics of the system, such as light transmission, reflective coatings, light scatter between phototubes. If it is assumed that none of the above factors disturb the Anger, et al., process, then the cited invention would locate the center of each light flash in the scintillator but not necessarily the site or location of the incident radiation.

There are also physical phenomena which often cause the center of light in the scintillator to be displaced from the incident radiation. These result in serious degradation of the image by falsely locating points. The principal phenomenon is Compton Scattering. In this process the initial interaction of the incident radiation with the scintillator results in a partial conversion to light, the attenuated ray then is scattered at an angle. At some point, which may be within the scintillator, the scattered ray may be converted into a light flash. If, when both light flashes occur within the crystal, the sum signal is accepted in an uncorrected form the event will be falsely imaged as if it resulted from a single interaction at some point between the two light flashes, which degrades or provides a false image.

This effect has been partially overcome by making the scintillator thin so that more scattered rays would leave the scintillator before interacting, but by limiting the thickness of the scintillator, its sensitivity to high energy radiation is seriously compromised.

BRIEF DESCRIPTION OF THE INVENTION

A radiation image detector responsive to incidences of individual radiation stimuli includes a collimator, at least one scintillator in the path of radiation emissions from a distributed radiation source, a plurality of photodetectors for viewing each scintillator, and signal processing means, a storage means, and a data processing means interconnected with one another and connected to the photodetectors. Also a display means is connected to the data processing means to locate a plurality of radiation sources in the distributed radiation source and to provide an image of the distributed radiation sources. A calibration means or test means is used to provide the device with radiation emission response data and location data from radiation emissions at a plurality of known locations for use by the data processing means to derive more accurately the location of each of a plurality of distributed radiation emissions. The calibration means or test means includes a radiation source holder, and driving means to expose a plurality of known positions on the scintillator to a beam of collimated radiation. The radiation material placed in the radiation source holder may be of the material or of material with similar properties as the distributed radiation to be detected because the response will vary with the nature of the source radiation. The radiation source holder is driven by the drive means successively or serially to different known points in space. The known radiation source holder includes position signal means for producing signals which indicate the position of the known source in space. The response stimulated in each scintillator and detected by the photodetectors by emissions from the radiation source holder are processed through the signal processing means to the data processing means for storage with the respective position signals from the position signal means. The digitized response signals and position signals are stored in the storage means. The signal processing means is used to alter or discard some of the calibration information from the known radiation source such as by pulse-height analysis and analog to digital conversion. After calibration the radiation detection device may be used in a measuring mode to measure the distribution of radiation from an unknown location to locate the particular position of each of a plurality of radiation sources in the distributed radioactive material by comparison of the signal pattern from each event with the stored signal patterns from the events during calibration. Patterns matching within programmable limits are reported to the image storage as radiation coming from the location stored with the matching calibration pattern from the source positioning means when the calibration source was in the position yielding the matched pattern.

It is an object of this invention to provide a new and improved radiation source detector for detecting the location of a radiation source.

Another object of the invention is to provide an instrument for the more accurate survey of the location of the radiation source by utilizing a known intensity radiation source at a known location.

It is another object of this invention to provide original data of the location and intensity of an unknown radiation source that does not require expensive field uniformity corrections because of deficiencies in the principle mode of operation.

It is another object of the invention to provide a system for the more accurate survey of the distribution of a radiation source which reduces artifacts: from Compton scattering, from scintillator inhomogeneity, from reflections of the scintillator walls, from photodetector nonuniformity, from geometrical nonlinearities such as regions between photodetectors and edge effects.

It is another object of the invention to make a device which is more sensitive to high energy radiation by using a thick scintillator without incurring the artifacts caused by scattering within the scintillator.

It is another object of this invention to provide an accurate radiation detection device including a plurality of individual scintillators.

It is another object to digitize the original data from the signals from the radiation sources at each location in order to retain the original data input during data analysis.

A further object is to provide an instrument for the more rapid detection of the source location of small amounts of radiation.

An additional object of this invention is to provide a radiation detection device utilizing less expensive scintillators.

In accordance with these and other objects which will be apparent hereinafter, the instant invention will now be described with particular reference to the accompanying drawings.

DESCRIPTION OF A PREFERRED EMBODIMENT

Figure 1:
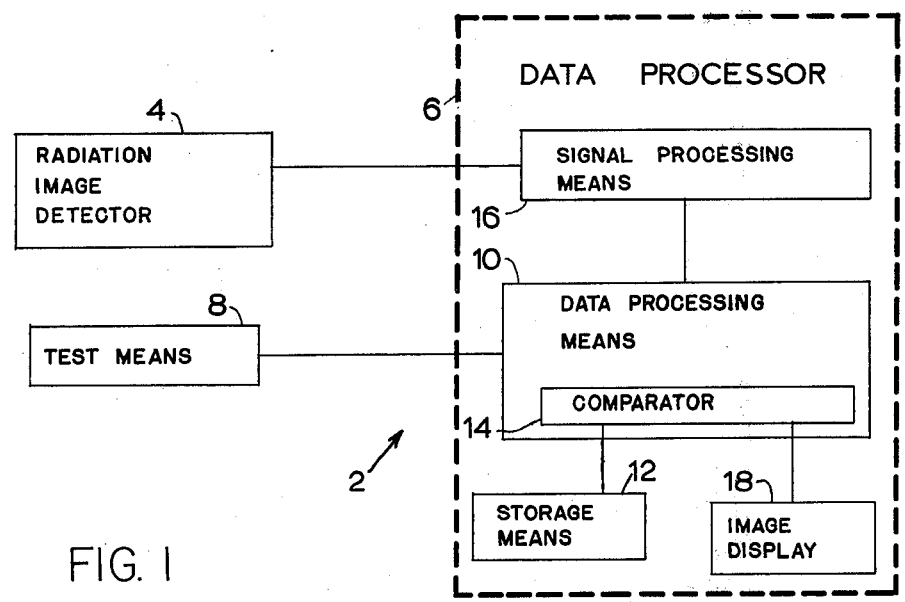
FIG. 1 is a block diagram of the radiation detection device.

Referring now in detail to the drawings, wherein embodiments of the invention are shown, and referring, particularly, to FIG. 1, the radiation detection device, generally designated by numberal 2, includes a radiation image detector 4 for detecting radiation emissions, and a data processor 6 that may be a computing device for collecting, storing, analyzing, and displaying radiation source location or position data. A test means or calibration means 8 is used in conjunction with the radiation image detector 4 to provide radiation emission response data from a known location. The response data from a plurality of known locations along with the location data from each location is processed through the data processing means 10 to the storage means 12. The stored data is later used in comparator 14 to compare the stored data with response data from an unknown location. The response data from an unknown location is transmitted from the radiation image detector 4 to the interconnected signal processing means 16, the data processing means 10, and comparator 14. When the response data from an unknown location is matched with stored response data from many known locations the stored location data identifies the location of the response data from an unknown location. After a match has been made, the location data may be displayed on image display 18.

Figure 2:
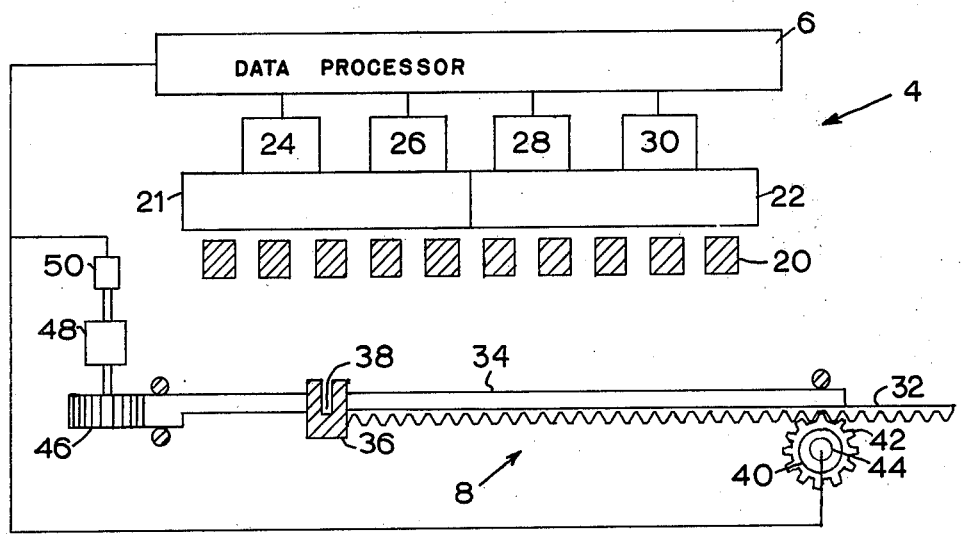
FIG. 2 is a side view of the calibration means, the collimator, two scintillators, and a plurality of photodetectors connected to the data processor.

Referring now to FIG. 2, the radiation detection device generally designated by numeral 4, includes a collimator 20, a plurality of scintillators illustrated by numerals 21 and 22 in the path of radiation emissions from the radiation test means or calibration means 8 or a distributed radiation source, not shown, after removing the test means 8. The radiation detection device 4 also includes a plurality of photodetectors 24, 26, 28, 30 for viewing each scintillation in each scintillator 21 and 22. The photodetectors are connected to the data processor 6. The test means 8 includes two racks 32 and 34 in the X and Y-axis respectively for supporting a collimated radiation source holder 36. The source holder 36 holds radiation source material 38. The source holder is moved along the X-axis by motor 40 with engaging pinion 42. The X-axis position signal of the source holder 36 originates in rotary position indicator 44. The signal is a digital number corresponding to the X-axis position. The source holder 36 is moved along the Y-axis by pinion 46 driven by motor 48. The Y-axis position signal of the source holder 36 originates in rotary position indicator 50. The signal is a digital number corresponding to the Y position. Another rack and pinion drive may be used to drive the source holder 36 in the Z-axis.

Figure 7:
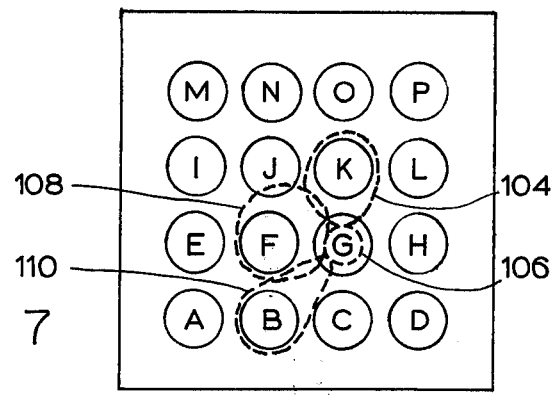
FIG. 7 is a plan view of a plurality of photo-detectors over a scintillator.
Figure 8:
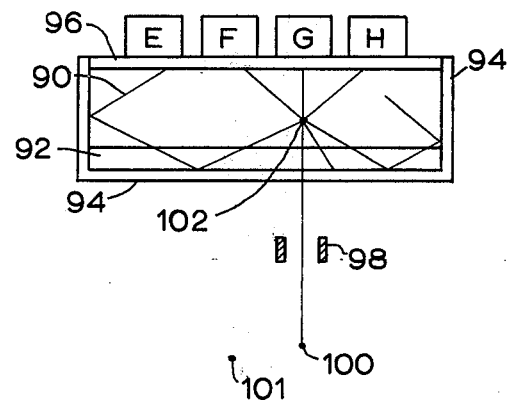
FIG. 8 is a cross sectional front view of the device shown in FIG. 7.

FIG. 7 shows a plurality of photodetectors A to P over a scintillator 90. FIG. 8 is a front view of the Device shown in FIG. 7 showing scintillator NaI (T1) 90, low density light pipe 92, reflective coating 94, and quartz window 96 to pass light to the photodetectors A to P. A radiation emission from a source 100 passes through the collimator 98 into scintillator and stimulates a light emission 102 under photo-detector G in the preferred absorption mode, lesser signals will come from the surrounding photodetectors J, K, L, H, D, C, B, F and still less on the others photodetectors. The preferred absorption mode can be programmably distinguished from nonpreferred modes because the photodetector signal pattern will be reproducible when the known source is at a given location while nonpreferred modes will give a variety of signal patterns which can be rejected. In the event of a Compton Scatter, there will be a plurality of light emissions in the scintillator. The pattern of signals from the photodetectors will show that the event was from a Compton Scatter and therefore may be discarded as from an unidentifiable source.

When the known source is at location 100, the same number of radiations should be incident upon 90 as when the source is at location 101. Therefore, we can determine correction and program a correction for the fact that the fraction of accepted incident radiations divided by total incidents of radiation will vary at different locations.

To clarify the positioning concept more, the magnitude of the signal on K. would be the same for a source at any location on an irregular circle 104. The circle 104 is irregular because of detector system imperfections. The signal on G would be the same for a source at any location on an irregular circle 106. The same is true for signals on F and B in respect to circles 108 and 110, respectively, but there is only one location where all the circles coincide. The computer 6 can be programmed to note this pattern.

Figure 3:
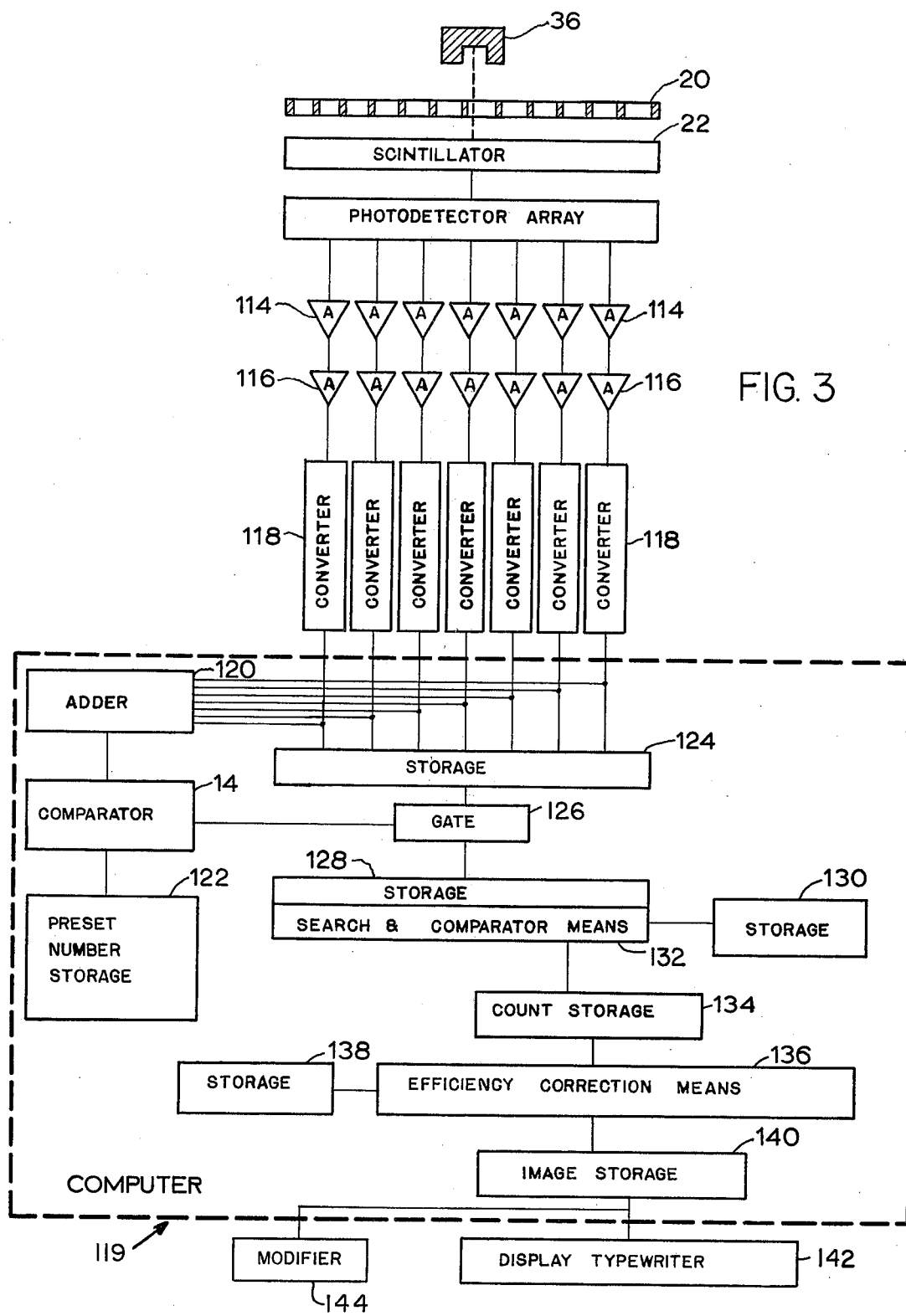
FIG. 3 is a more detailed block diagram of the radiation detection device.

In use, a gamma ray from source holder 36, as shown in FIG. 3, passes thru collimator 20 and is absorbed by scintillator 22. A light flash is emitted from the scintillator. Some of the light passes thru the transparent scintillator 22 thru the window at the rear of the scintillator directly to the photodetectors. Some of the light is reflected off the reflective coatings on other surfaces and then into the photodetectors. Light striking the array of photodetectors produces a set of electrical signals proportional to light intensity. The signals are amplified by preamplifiers 114 and amplifiers 116 and converted into a set of numbers by analog to digital converters 118. The signals from the converters 118 may be transferred into a large commercial computer 119 that is programmed to provide the output data as set forth here below. The sets of numbers from converters 118 are summed in calculator 120. The sum is compared in comparator 14 with a preset number in number storage means 122 representing the energy level of the gamma rays one seeks to measure. If the two numbers do not match within the prescribed limits, the incoming set of numbers is discarded, if they match, the set of numbers, which had been momentarily stored at interim storage means 124 are passed thru the gate 126 into the distributed radiation storage means 128. The set of numbers in the distributed radiation storage means 128 is now compared with the large data bank collected during the calibration operation and stored in known location data storage means 130. This data bank contains sets of numbers representing acceptable phototube signal patterns produced from each known source location by the calibration means along with location information. When searching means and comparator 132 cannot find a suitable match, the signal set will be discarded. When a match is made within prescribed limits, a mark or single count is stored in count storage means 134 at the location found in the known location data storage means 130 when the match occurred. The count storage means 134 stores a set of locations corresponding to the calibration locations. These represent the region measured or "seen" by the collimator-scintillator assembly. As each matching event is represented by a count at a specific location, a pattern or image will be built up in count storage means 134 wherein the number of counts will represent the number of rays coming from that location or the distribution of radioactive material.

The (emission response) intensity location data stored in count storage means 134 is corrected point by point by efficiency correction means 136 for variations in efficiency at each location using correction factors for each location stored in correction factor storage means 138 during callibration. If the stored ratio (number accepted this location divided by the maximum number of accepted patterns for any location) in the correction factor storage means 138 is divided into the number or counts stored in the count storage 134 for that location, the image data store in image storage 140 will now be corrected for efficiency variations. That is, the image storage 140 will be further corrected for imperfections in the detector system.

In operating the test means 8, a sample of the gamma ray emitting radionuclide technetium 99m is placed in the collimated source holder 36 which traverses serially a region in front of collimator 20 and scintillator assembly 22. At each location, which is combined to make up the region, the location data is stored in the memory along with location signal patterns collected while source is in that location. The patterns are programmably operated upon to discard those which are not reproducible so that one or more patterns emerge as representative of that location. The patterns are stored in storage means 130. Information on the total number accepted is stored in storage means 138. When all locations have been traversed by the calibration procedure, the ratio of the number accepted in this location divided by the maximum number accepted in any location is calculated and then stored for each location in storage means 138.

When a patient is placed under the detection device after technetium 99m was administered to the patient, gamma rays from the radinuclide within the patient's body pass thru the collimator and strike the scintillator, patterns are produced, accepted, rejected, matched, and processed so that a collection of data is assembled and stored in image storage means 140 which represents the distribution of the radionuclide within his body with many of the imperfections of the detection system having been overcome by the data processing procedures. This may be displayed as an image by one or several display devices such as typewriter 142. Or it may be further modified by modifier 144 prior to display to provide better picture contrast. The distribution pattern of the technetium 99m within the patient may be of diagnostic utility.

Figure 4:
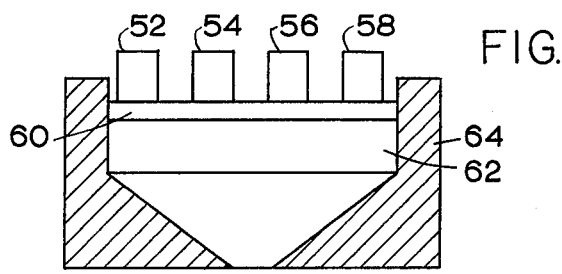
FIG. 4 is a side view of another radiation image detector.

Referring now to FIG. 4, the photodetectors 52, 54, 56 and 58 are positioned against a sodium iodide light pipe shield 60 that is placed on top of a sodium IODIDE (TI) scintillation crystal 62 or mosaic of individual crystals. The sodium iodide light pipe shield acts as a back shield. The shield 60 and crystal 62 are partially surrounded by a pinhole collimator 64 to restrict false scintillations and to focus radiation.

Figure 5:
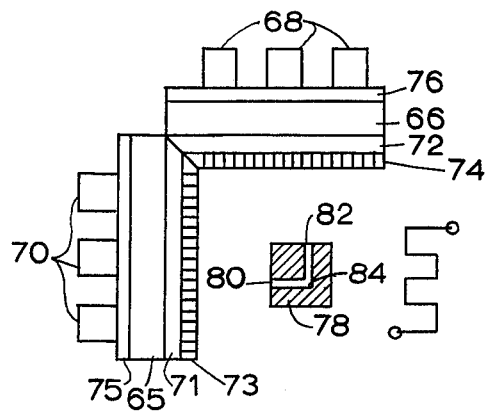
FIG. 5 is an illustration of a depth detector.

FIG. 5 shows two crystalline scintillators 65 and 66 that are positioned in two separate planes with a 90° angle between the two planes. The plurality of photodetectors 68 and 70 are utilized to provide radiation source data in the X, Y and Z-axis. The photodetectors 68 and 70 are adjacent the scintillators 65 and 66. Low density light pipes 71 and 72 are placed between collimators 73 and 74 and scintillators 65 and 66 respectively to protect the scintillators from shock and to improve the angle of light reflection from the front face of the collimator. Quartz windows 75 and 76 may be placed between the scintillators and the photodetectors. The source holder 78 is moved in X, Y, and Z directions to provide the stored location and response data. The source holder 78 has two openings 80 and 82 to provide two collimated beams of radiation from the material placed adjacent numeral 84.

Figure 6:
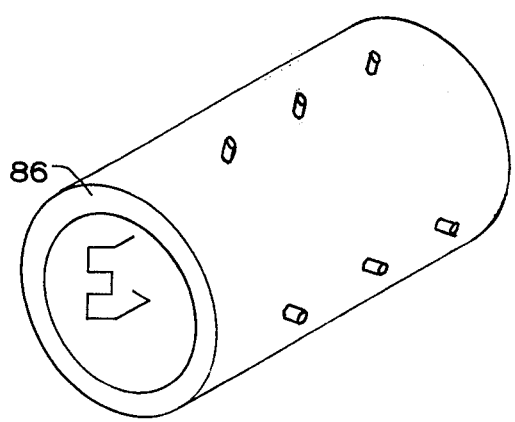
FIG. 6 is an illustration of a large detector for receiving a pattern.

FIG. 6 shows additional shape of the scintillator. The annular liquid scintillator 86 may be used to surround the distributed radiation source to locate the radiation source. The test means may include a source holder that provides uncollimated radiation from a known location. The diameter of the annular scintillator is such that a patient may be slid into the cylindrical opening. The distributed radiation placed inside the annular shaped scintillator may be analyzed to determine the precise location of a plurality of radiation sources. An annular collimator may be placed in the scintillator. A plurality of photodetectors are placed about the entire outer surface of the scintillator. The photodetectors may be immersed in the liquid scintillator.

The instant invention has been shown and described herein in what is considered to be the most practical and preferred embodiment. It is recognized, however,

What is claimed is:

1. A radiation detection device for surveying the distribution of a distributed radiation source to derive the location of a plurality of radiation sources comprising,
   a layer of scintillation material in the path of the radiation emissions from the radiation source for receiving the radiation to provide light indications, said layer of scintillation material includes a front face adjacent the radiation source,
   a plurality of photodetectors disposed in view of said scintillation material for detecting the light indications in said scintillation material,
   a data processor connection to said photodetectors, said data processor including storage means, comparator means, a storage reviewing means, connecting means, and a comparator match indication means,
   said storage means including, a plurality of response data records from said radiation detection device when said scintillation material was engaged by emissions from a known radiation source location with the known radiation source location data for each response,
   said connecting means connecting said photodetectors to said comparator means to connect response data from an unknown radiation source location with said comparator means, said connecting means connecting said storage reviewing means to said storage means to review said stored data, and said connecting means connecting said comparator means to said storage means to match said response data from an unknown radiation source location with a particular piece of stored response data from a known radiation source location, said match indication means connected to said comparator for indicating a match and reading out the stored location data.

2. A radiation detection device for surveying the distribution of a distributed radiation source to derive the location of a plurality of radiation sources as set forth in claim 1 wherein,
   said data processor for processing the original data from said photodetectors to provide a digital output.

3. A radiation detection device for surveying the distribution of a distributed radiation source to derive the location of a plurality of radiation sources as set forth in claim 1 including,
   at least a collimator between said scintillator and the radiation source for collimating the radiation emissions.

4. A radiation detection device for surveying the distribution of a distributed radiation source to derive the location of a plurality of radiation sources as set forth in claim 1 including,
   radiation source location means including a radiation material holding means, moving means connected to said material holding means, and location indication means connected to said moving means, said radiation source location means removeably positioned for movement into various positions in front of said scintillation material, said location indication means connected to said data processor and said storage means to store known radiation source location data with associated radiation response data from said scintillation material and said photodetectors when exposed to radiation material.

5. A radiation detection device for surveying the distribution of a distributed radiation source to derive the location of a plurality of radiation sources as set forth in claim 4 including,
   a collimator between said radiation source and said scintillator,
   said scintillator including a plurality of scintillation crystals,
   at least one anolog to digital converter connected to said photodetectors, said data processor connected to said converter, said data processor including calculating means connected to said converter to sum input numbers, said calibrating means connected to said comparator, a present number storage means connected to said comparator for rejecting high and low reaction data, gate means connected to said comparator to exclude high and low reaction data, correction means connected to said storage means and said comparator to provide corrected computer output data for better resolution.

6. A method of locating and displaying radiation sources from a distributed radiation material at unknown locations comprising the steps of:
   a. placing at least one known source of radiation in locations with a positioning means,
   b. detecting with detecting means reaction data from said known source of radiation in each known location of step (a),
   c. placing sources of radiation in a body at unknown locations,
   d. detecting reaction data with said detecting means from said radiation sources of unknown distribution in the body,
   e. providing a known location of each source of radiation in the body that was detected in step (d) by comparing the detected reaction data from each radiation of step (d) with detected reaction data from step (b), and
   f. combining the known locations of each source of radiation in the body detected in step (d) to provide a visual display of the sources of radiation in said body in the final form of an image of the radiation sources in the body.

* * * * *

UNITED STATES PATENT OFFICE
CERTIFICATE OF CORRECTION

PATENT NO. : 3878373
DATED : April 15, 1975
INVENTOR(S) : Alvin S. Blum

It is certified that error appears in the above-identified patent and that said Letters Patent are hereby corrected as shown below:

"Coral Gables" should be changed to ---Fort Lauderdale---.

Column 1, line 25 omit ", which".

Column 2, line 25 omit "holder".

Claim 2, line 6 delete "to provide" and insert ---provides---.

Signed and Sealed this twenty-eight Day of October 1975

[SEAL]

Attest:

RUTH C. MASON
*Attesting Officer*

C. MARSHALL DANN
*Commissioner of Patents and Trademarks*